United States Patent Office 2,705,177
Patented Mar. 29, 1955

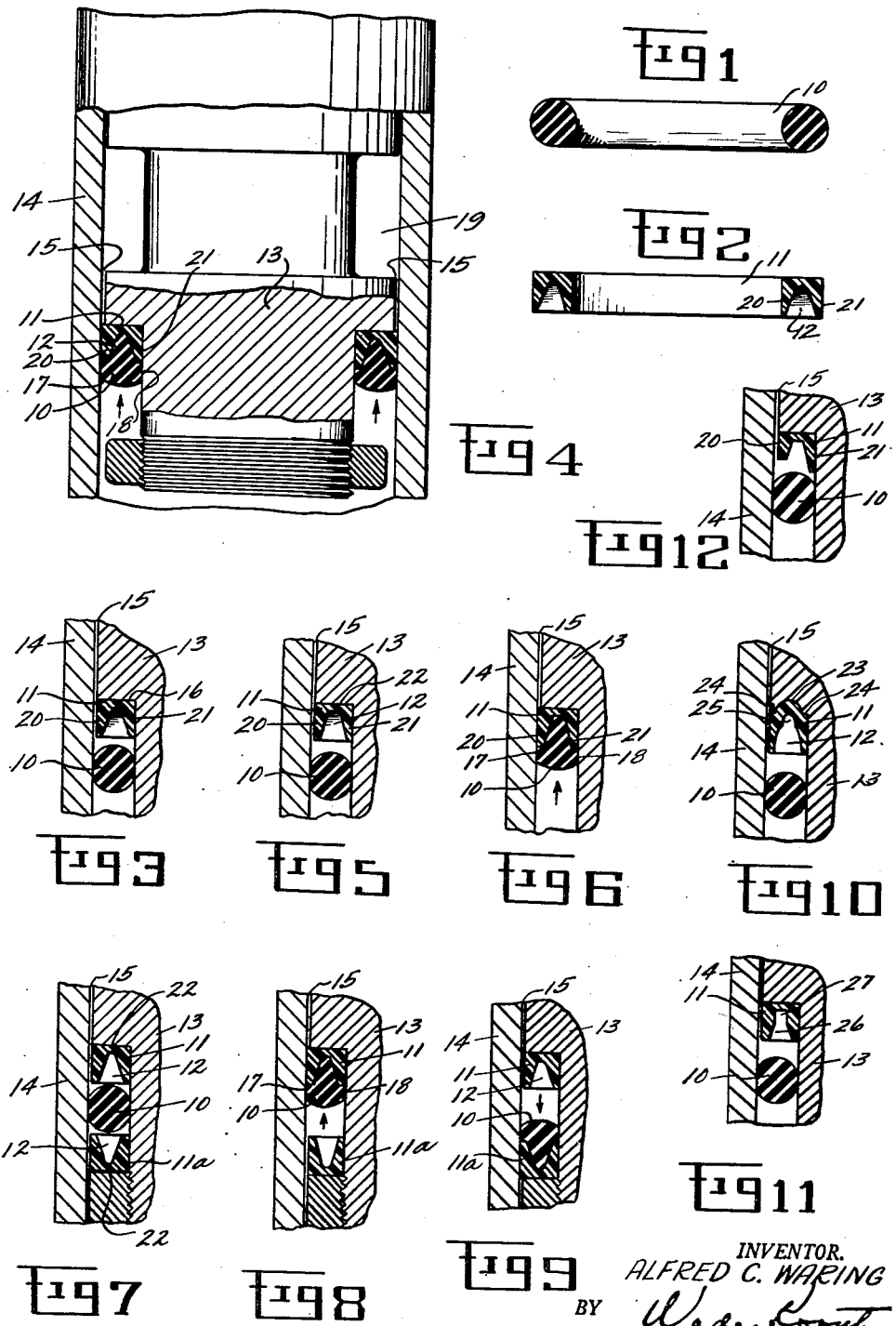

2,705,177

HYDRAULIC PACKING AND SEAL ESPECIALLY ADAPTED TO RECIPROCATING PARTS

Alfred C. Waring, Dayton, Ohio

Application December 19, 1950, Serial No. 201,670

8 Claims. (Cl. 309—23)

(Granted under Title 35, U. S. Code (1952), sec. 266)

The invention herein described may be manufactured and used by or for the Government for governmental purposes without payment to me of any royalty thereon.

In my Patent 2,494,598 of January 17, 1950, I disclosed a hydraulic backing and seal comprising a semicircular backing ring of more or less crescent shape cross section, this ring being preferably made of the plastic known as Teflon. Teflon is a hard polymerized tetrafluoro-ethylene plastic made by the E. I. Du Pont Company. The seal also comprised a rubber O ring of somewhat larger diameter than the inner curvature of the backing ring. While this construction is highly useful and efficient at hydraulic pressures up to 4,000 pounds per square inch, it is limited to use on a ring land having a concave base. Therefore it could not be used in flat-based rectangular ring lands more commonly encountered.

Upon attempting to use flat bottomed V groove backing rings in such lands it was found that when the V groove came to a sharp point, under high pressures the V type ring would break through at the thin point of the web produced by the sharp point or apex of the V. This action promoted a very rapid deforming action against all opposed surfaces and the ring divided into two round sections which operated well at low pressures. It could not however be satisfactorily operated at 3,000 pounds per square inch or greater pressures.

Briefly stated, in the present improvement the seal comprises a Teflon backing or back-up ring made in size and shape to conform to the ring land in which it is to be installed, although a flat surface is preferred. The Teflon backing ring is provided with V grooves which, instead of coming to a sharp tip or apex, terminates in some other blunt configuration, for example, that of a truncated V, a rounded V or a semicircular tip superposed on the end of the V groove. The lips of the backing ring are made of a flat circular surface opposed to the O ring, which may vary in desired widths. I have found that the flat surface of the backing ring lips protects the scaling surface of the O ring against extrusion and subsequent damage. The provision is made of a heavier section for the lips of the backing ring and a more or less sharp shoulder at the outer end of said such lips. Together with the deforming or bending action and radial stretching action which occurs in the web of the Teflon backing ring; i. e., that section of the ring which extends from the tip or apex of the V groove to the land-contacting surface of the ring, brings the sharp shoulder of the backing ring into contact with the shoulder in which the seal works, to produce an especially tight seal and to promote a long wearing quality by reason of the heavier sections which are employed. The backing ring forms a base upon which the rubber sealing made is firmly supported until the entire side of the backing ring is worn away.

One object of the invention is therefore the provision of a seal that will, in at least one of those forms, fit the conventional rectangular lands of reciprocating parts;

Another object is the provision of a seal in which a tendency to split the backing ring is obviated;

Another object is to provide a seal in which the side of the backing ring will become cocked against the cylinder due to the flexing action occurring at the web of the ring;

Another object is to provide a seal in which the ends of the backing ring lips are flattened so as to provide better support for the O ring against extrusion, and which will give longer wear due to the heavier section employed than was described in my previous patent, and Another object is to provide a type of backing ring suitable for both ends of the groove in a piston in reciprocating machinery. A seal of this type, in the O ring is held between the two backing rings, makes possible the use of shorter and consequently lighter pistons, which is of great value in high speed reciprocating machinery.

Referring now to the accompanying drawings:

Fig. 1 shows the oil proof rubber O ring in transverse section;

Fig. 2 shows the Teflon backing ring in similar section;

Fig. 3 is a fragmentary view in section of a portion of the cylinder wall and piston showing the usual relative positions of the O ring and backing ring, the O ring being somewhat compressed to show its larger diameter as compared with the backing ring;

Fig. 4 is a view, partly in section of a cylinder and piston of a hydraulic jack. This view shows in section the deformation of the O ring when it is compressed by a full hydraulic pressure against the backing ring of the cylinder wall;

Fig. 5 is a fragmentary sectional view corresponding to Fig. 3, except that the backing ring has a modified cross section resulting from the use of a trapezoidal groove;

Fig. 6 is a view corresponding to Fig. 5 and shows in relative deformation of the O ring when under full hydraulic pressure from below of forcing it into the trapezoidal groove;

Fig. 7 is a fragmentary view corresponding to Figs. 3, 5 and 6 except that the piston in this case is intended for reciprocating motion and two backing rings are shown in cross section accommodating an O ring between them. In Fig. 7, no pressure is being applied to any of the parts;

Fig. 8 is a fragmentary view corresponding to Fig. 7, the O ring being deformed by pressure exerted in the direction of the arrow;

Fig. 9 corresponds to Fig. 8 except that now, on the return stroke of the reciprocating part, the pressure is being oppositely exerted.

Fig. 10 corresponds to Fig. 5 except that the cross sectional form of the backing ring is semi-arcuate and the V groove therein is made in the form of a compound curve;

Fig. 11 corresponds to Fig. 10 except that the backing ring is grooved with a V groove having a squared top portion; and Fig. 12 corresponds to Fig. 11 with the exception that the outer lip of the backing ring has been shortened to promote a rolling action of the O ring for the purpose of picking up lubricant.

In the drawings, 10 is an O ring made of oilproofing rubber which is preferably the well known "neoprene" made by the E. I. Du Pont Company. 11 is a backing ring made from "Teflon" or equivalent synthetic resin material. The ring 11 is generally preferred to be a nearly square cross section, although the ring section may be considerably deeper on its vertical side. The rings 11 throughout Figs. 2, 3, 7, 8, 9 and 10 are provided with a groove 12, the cross section of which is of the approximate shape of a one-half sine wave or a letter V having a rounded junction tip. The depth of the groove 12 is never so great that sufficient stock is not left between the groove tip and the upper surface of the ring. This amount of stock varies according to the shape of the groove, the material of the ring, the size of ring and the kind of duty to which it will be subjected. Skilled workers in the art can select suitable web thicknesses for given sets of circumstances. The backing ring should be from 10% to 25% less in diameter than the cross sectional diameter of the O ring. This difference in width or diameter insures that the O ring shall at all times have enough material to fill the groove 12 completely and still have enough stock left over to provide a seal such as is shown at 17 in Fig. 6 or Fig. 8.

Referring to Fig. 3, 13 is a fragment of a piston which is slidable in a hydraulic cylinder, a portion of the wall of which is 14. Between the piston 13 and the wall 14 there is a cleared space 15 which is preferably .005" although for special purposes it may be more or less. The piston 13 is machined to a shoulder 16 which is preferably .001" or .002" wider than the cross sectional width of the backing ring 11 which abuts it. Below the backing ring 11 there is shown the O ring 10 compressed to a normally oval cross section by reason of its larger sectional diameter than that of the backing ring 11. The larger sectional of the diameter of the O ring insures a band of contact between that ring and both the pistons and cylinder wall during the entire length of stroke, whether there be hydraulic pressure applied during any part of the cycle or not. Special O rings of larger cross section diameter may be optionally employed to increase this band of contact whenever necessary. The band of contact is of particular value, for example, when the inner surface of the cylinder is rough either due to imperfect machining or to the accumulation of calcium or magnesium salts resulting from the use of impure water as the hydraulic fluid. In Fig. 3 no hydraulic pressure is being applied.

Referring now to Fig. 4, the hydraulic cylinder 14 is shown to a greater extent and the hydraulic piston is shown only partially in section.

Hydraulic pressure has been applied in the direction of the arrow against the O ring 10, causing a deformation thereof with consequent close engagement with the backing ring 11 so as to fill the groove 12 completely. However, there is enough rubber stock left over, which cannot enter the groove and for that reason builds up below the backing ring 11 and the groove 12 to form an outer lip 17 which contacts the cylinder wall and also the piston surface 18. These lips are so efficient as seals that no substantial leakage passes them into the clear surface 19 behind the piston, even at very high static or running pressures. Sealing action of the lips 17 and 18 is aided by the spreading apart of the backing ring 11 at the groove 12 so that the V groove is made larger at its base. The base tips of the backing rings 20 and 21 consequently deform and contact the middle walls of both the cylinder 14 and the piston 13, thereby making the seal considerably tighter and causing the area of greatest wear on the backing ring to be the entire outer surfaces 20 and 21 of the backing ring 11. The points of the backing ring walls resulting from the presence of the V groove are always flattened so that no tendency exists for the backing ring to cut the O ring with the sharp edge, and also to prevent any clearing or spreading of the outer tips of the V groove. None but heavy sections are therefore subjected to sliding friction under hydraulic pressure.

Referring now to Fig. 5, this figure is in all respects similar to Fig. 3 except that the groove 12 of the backing ring is blunted to a flat surface at its upper tip 22. In Fig. 6, the form of backing ring employed is that of Fig. 5, but hydraulic pressure is being applied in the direction of the arrow, thereby expanding the backing ring 11 and its tips 20 and 21 to seal off the clearance space 15. The O ring has been forced in the V groove, filling the latter completely, including the flattened tip 22 thereof. The formation of lips 17 and 18 has been accomplished, so that the O ring and the backing ring are to all intents and purposes a single unitary structure.

Referring now to Fig. 7, the backing rings 11 and 11a, upper and lower respectively, are arranged with their V groove 12 opposed, the O ring 10 being mounted between them. In Fig. 7 no pressure has yet been applied, the only compression being in the sidewise direction of the O ring, producing a normally oval shape in the cross section of the member. It is here shown that for high pressure reciprocating movement, a rounded tip 22 of the V groove 12 is preferred.

In Fig. 8, the O ring is shown filling the upper V groove 12. The lips 17 and 18 formed by conception of the O ring are shown in full contact with the piston and cylinder walls; likewise the upper backing ring is in full contact with these walls, the cleared space 15 being completely occupied.

Fig. 9 shows the lower backing ring completely filled by the O ring in the same manner as shown in Fig. 8. In a reciprocating piston in which the O ring is located between the upper and the lower backing ring, the backing rings stay in place during reversal, but the O ring transfers its position to abut that ring against which the pressure is being exerted. This reversal is shown in Figs. 8 and 9.

In Fig. 10 it is shown that the backing rings used in my invention are not necessarily flat surfaced at the tops thereof, but may have the same form as the land against which they are to work. In the form shown in Fig. 10 the ring 11 is provided on its top surface with a curvature 23 and shoulders 24 which coincide with the form of the land. The groove 12 is in its lower part the shape of a one-half sine wave, while at the tip of said sine wave, another but smaller sine wave 25 is superposed, thereby in effect making the ring 11 double grooved. This form of ring is of particular value when a curved land must be accommodated since the web thickness between the groove 25 and the curvature 23 is held nearly uniform at all points. Consequently, no point on either curvature is sufficiently secured to the ring to be the source of sliding or turning.

In Fig. 11 the backing ring 12 is provided with a lowered V groove 26 in an upper flattened square groove 27. This form of ring is of particular value for both low and high pressure operating conditions because the ring 11 is enabled to flex at the upper corners of the groove at 27 to compensate for considerable roughness on the interior surface of the hydraulic cylinder 14. At the same time the tendency to slide or turn is minimized on account of the considerable distance between the upper corners of the groove 27 and the upper corners of the entire ring.

In Fig. 12 the backing ring 11 is provided with an inner long lip 21 and a short outer lip 20, the groove 12 between the lips being of V form with a flattened tip. It has been found that shortening the outer lip 20 and leaving the inner lip 21 of normal length gives the O ring 10 a tendency to roll between the piston 13 and the hydraulic cylinder 14. The outer lip 20 should be about two-thirds as long as the inner lip 21. This form of backing ring is especially valuable where water is used as the hydraulic fluid. Water alone possesses insufficient lubricating properties, but when special oils, which may be soluble in the water, or when soap is added to the water, additional lubricating properties are acquired by it. The soapy or oily water will not however penetrate between the metal walls and the O ring unless fresh surfaces are from time to time opened to contact with the water and its additive. The sealing action of the O ring promoted by the form of backing ring shown in Fig. 12 insures frequent contact of the sides of the O ring with the lubricating pressure medium.

In the appended claims, the terms V or V groove are intended to be generic to the groove shapes shown, i. e., not limited to grooves having absolutely straight sides.

What I claim is:

1. In combination, in a seal against fluid pressure adapted to be disposed in the radial space between two telescoped members, a first sealing ring composed of a hard, heat resisting, non-porous, tough, flexible, chemically inert plastic material having a substantially rectangular cross-section, one face thereof having a centrally disposed elongated substantially V-shaped groove therein resulting in thin elongated side walls having blunt lips at their outer extremities adjacent the groove, a second sealing ring of circular cross-section made of solid oilproof rubber and larger in cross-section than the first ring arranged for complementary sealing engagement with said first sealing ring, said rubber ring being disposed between said first ring and the pressure transmitting fluid so that under pressure the rubber ring deforms to fill the V groove of the plastic ring in sealing relation with the blunt lips of the adjacent walls thereof and completely overlap one face thereof to prevent substantially the passage of pressure transmitting fluid past said rings.

2. A seal according to claim 1 in which the cross sectional width of the backing ring is from 10% to 25% less than the cross sectional diameter of the O ring.

3. In combination in a seal for a piston or like displaceable member intended to reciprocate in a cylinder, said seal comprising, positioned in a groove encircling said displaceable member, an upper seal ring and a lower seal ring of hard heat resisting nonporous tough flexible chemically inert plastic material, said rings being oppositely disposed to each other and substantially abutting the groove walls, each of said rings having a substantially rectangular cross section grooved with an elongated central V groove of substantial area and substantial dehiscence which is, however, less than that of an obtuse angle, in one face thereof forming thin elongated side walls adjacent said groove, said side walls having blunt lips at their outer extremities, said groove section coming to a blunt tip whereby to leave a web thickness of substantial flexibility and durability between the bottom of said groove and the other surface of the said ring, each of said seal rings facing the other with its V groove and a third sealing ring positioned between the V grooves of the two first mentioned rings, said third sealing ring being made of resilient solid rubber and being of circular cross section larger than the width of the cross section of the first seal ring and adapted for a sealing overlapping engagement with the respective upper and lower seal rings.

4. In a hydraulic seal especially adapted for reciprocating parts, a backing ring consisting of hard polymerized tetra-fluoro-ethylene plastic and a resilient O ring made of oil proof synthetic rubber, said backing ring having a cross sectional width of from 10% to 25% less than that of the cross sectional diameter of the O ring, said backing ring being further characterized by a cross section adapted to fit closely the piston land upon which it is to work and two annular lips diverging outwardly away from that surface of the backing ring which is intended to be in contact with said land, said lips being flattened so as to be blunt on their outer tips and partially enclosing a groove in the surface of the ring opposite that of the land-engaging surface, said ring being generally of the shape of a one-half sine wave and comprising a compound internal curve defining a smaller groove superposed upon the one-half sine wave shape, said smaller groove creating a web in the ring of comparatively small thickness, great flexibility and radial expansibility, said web being however of a sectional width sufficient to assure durability of the ring under conditions of use, and to permit easy deformation of the blunt lips by the O ring whereby to widen the groove and to force the blunt lips into a tight contact with the reciprocating and static surfaces which it is to seal and to receive the O ring under hydraulic pressure into the groove without splitting the ring at the web thereof under normal service conditions for at least a normal period of service.

5. In a hydraulic seal especially adapted for reciprocating parts, a backing ring consisting of hard polymerized tetra-fluoro-ethylene plastic and an O ring made of oil-proof synthetic rubber, said backing ring having a cross sectional width of from 10% to 25% less than that of the cross sectional diameter of the O ring, said backing ring being further characterized by a generally square cross section modified by a V groove and a small substantially square groove in the ring at the apex of the V groove, the resulting compound groove having the general shape of an inverted Y, said smaller groove creating a web in the ring of comparatively small thickness, great flexibility and radial expansibility, said web being however of a sectional width sufficient to assure durability of the ring under conditions of use and to permit easy deformation of the lips created by the groove whereby to widen the groove and to force the lips into a tight contact with the reciprocating and static surfaces which it is to seal on receiving the O ring under hydraulic pressure into the groove, without the splitting of the ring at the web thereof under normal service conditions for at least a normal period of service.

6. In a hydraulic seal especially adapted for reciprocating parts, a backing ring consisting of hard polymerized tetra-fluoro-ethylene plastic and an O ring made of oil-proof synthetic rubber, said backing ring having a flat upper land-contacting surface, a cross sectional width of from 10% to 25% less than that of the cross sectional diameter of the O ring, said backing ring being further characterized by a trapezoidal section groove in a lower surface of the ring, said groove creating a pair of oppositely angled lips; flattened tips on said lips, the outer one of said lips being substantially two-thirds as long as the inner lip.

7. A hydraulic fluid pressure seal for relatively reciprocable parts adapted to be lodged in a ring groove or land in one of said parts comprising a resilient O ring in said land and having an initial cross sectional diameter such that the ring is radially compressed into sealing contact with both said parts when in use, said O ring being made of a plastic rubber like material, and a back up ring for said O ring to prevent extrusion of said O ring into the clearance space between the reciprocable parts, the back up ring consisting of a hard tough non-porous plastic material having a generally rectangular cross section with an annular truncated V groove formed in the front face of the back up ring contacting the O ring forming thin elongated side walls, said side walls having blunt tips at their outer extremities the depth of the V groove being less than the axial width of the back up ring to thereby leave a web of material resisting radial separation of the grooved portions of the back up ring and the width of the base of the V groove being less than the radial depth of the back up ring to leave annular faces contacting the O ring, application of fluid pressure to the O ring axially compressing the O ring into the V groove of the back up ring forcing the blunt lip portions thereof into tight sealing engagement with the relatively reciprocable parts and radially expanding the back up ring so as to prevent extrusion of the O ring into the clearance space between said reciprocable parts.

8. A back up sealing ring for use with a flexible O ring in a fluid pressure seal between relatively reciprocable elements comprising an annular ring of a hard, heat resisting, nonporous, tough, flexible chemically inert plastic material having a substantially rectangular cross-section, a centrally disposed elongated V type groove in one face thereof resulting in thin elongated tapered side walls adjacent the groove, said side walls having blunt lips at their outer extremities, whereby on application of fluid pressure through the O ring, the O ring will deform to fill the V type groove of the back up ring to spread the blunt lips of the back up ring to seal the space between the relatively reciprocable elements and prevent extrusion of the O ring.

References Cited in the file of this patent
UNITED STATES PATENTS

| 2,349,170 | Jackman | May 16, 1944 |
| 2,456,356 | Aber | Dec. 14, 1948 |
| 2,494,598 | Waring | Jan. 17, 1950 |